United States Patent
Fan et al.

(10) Patent No.: US 10,826,295 B2
(45) Date of Patent: Nov. 3, 2020

(54) METHOD, APPARATUS AND STORAGE MEDIUM FOR DETERMINING DISTRIBUTED POWER SUPPLY ACCESS CAPACITY

(71) Applicants: CHINA ELECTRIC POWER RESEARCH INSTITUTE COMPANY LIMITED, Beijing (CN); STATE GRID CORPORATION OF CHINA, Beijing (CN)

(72) Inventors: Shixiong Fan, Beijing (CN); Ting Yu, Beijing (CN); Tianjiao Pu, Beijing (CN); Lixin Li, Beijing (CN); Yijun Yu, Beijing (CN); Zechen Wei, Beijing (CN); Xingwei Liu, Beijing (CN); Wei Han, Beijing (CN); Wei Wang, Beijing (CN); Chen Li, Beijing (CN); Shiguang Li, Beijing (CN); Xinjing Wu, Beijing (CN); Jiatong Du, Beijing (CN); Kun Wu, Beijing (CN)

(73) Assignees: CHINA ELECTRIC POWER RESEARCH INSTITUTE CO. LTD., Beijing (CN); STATE GRID CORPORATION OF CHINA, Beijing (CN)

( * ) Notice: Subject to any disclaimer, the term of this patent is extended or adjusted under 35 U.S.C. 154(b) by 284 days.

(21) Appl. No.: 16/061,654

(22) PCT Filed: Sep. 20, 2017

(86) PCT No.: PCT/CN2017/102422
§ 371 (c)(1),
(2) Date: Jun. 12, 2018

(87) PCT Pub. No.: WO2018/095123
PCT Pub. Date: May 31, 2018

(65) Prior Publication Data
US 2018/0375332 A1 Dec. 27, 2018

(30) Foreign Application Priority Data

Nov. 24, 2016 (CN) .......................... 2016 1 1042238

(51) Int. Cl.
*H02J 3/38* (2006.01)
*H02J 3/46* (2006.01)

(52) U.S. Cl.
CPC .............. *H02J 3/381* (2013.01); *H02J 3/382* (2013.01); *H02J 3/46* (2013.01); *H02J 2203/10* (2020.01);
(Continued)

(58) Field of Classification Search
CPC .... H02J 3/381; H02J 3/382; H02J 3/46; H02J 3/003; H02J 2203/20; H02J 2300/20
See application file for complete search history.

(56) References Cited

U.S. PATENT DOCUMENTS

| 2010/0100620 | A1 | 4/2010 | Sathish | |
| 2013/0289905 | A1* | 10/2013 | Ou | G06Q 10/06 702/61 |
| 2015/0162750 | A1* | 6/2015 | Varma | H02J 3/381 307/52 |

FOREIGN PATENT DOCUMENTS

| CN | 103135020 A | 6/2013 |
| CN | 105279346 A | 1/2016 |
| CN | 106451556 A | 2/2017 |

OTHER PUBLICATIONS

International Search Report in international application No. PCT/CN2017/102422, dated Dec. 27, 2017.
(Continued)

*Primary Examiner* — Robert E Fennema
*Assistant Examiner* — Jonathan Michael Skrzycki
(74) *Attorney, Agent, or Firm* — Syncoda LLC; Feng Ma (57) ABSTRACT

A method and an apparatus for determining the distributed power supply capacity to be accessed by a feed line of a
(Continued)

power distribution network, and a storage medium, the method comprising: determining feed line loss on the basis of load information of power distribution network feed line access nodes and circuit parameters; on the basis of the feed line loss, determining three-phase voltage change values of the feed line circuit; using a single phase having the greatest voltage change amongst the voltage change values, determining a maximum active power for distributed power supply access under voltage constraints; comparing the current of the feed line corresponding to the maximum active power with a circuit current limit, and determining the distributed power supply capacity to be accessed by the feed line; the apparatus comprises a feed line information collection unit, a voltage drop unit, a quantitative calculation unit, and a results analysis unit. The present method can be used for dispatching operation control of a distributed power supply in a power grid, and can ensure safe access to the distributed power supply and safe operation of the power grid, improving the access capacity of the power distribution network to the distributed power supply.

15 Claims, 4 Drawing Sheets

(52) U.S. Cl.
CPC ....... *H02J 2203/20* (2020.01); *H02J 2300/20* (2020.01)

(56) References Cited

OTHER PUBLICATIONS

Written Opinion of the International Search Authority in international application No. PCT/CN2017/102422, dated Dec. 27, 2017.

* cited by examiner

METHOD, APPARATUS AND STORAGE MEDIUM FOR DETERMINING DISTRIBUTED POWER SUPPLY ACCESS CAPACITY

CROSS-REFERENCE TO RELATED APPLICATIONS

The present application claims benefit of Chinese Patent Application No. 201611042238.6, filed on Nov. 24, 2016. The contents of the Chinese Patent Application are hereby incorporated by reference in its entirety.

TECHNICAL FIELD

The disclosure relates to the technical field of operation and control of distribution networks, and particularly to a method and device for determining a capability of a feeder of a distribution network in terms of accepting a distributed power supply and a storage medium.

BACKGROUND

With gradual improvement of living standards of people, requirements on the environment continuously increase requirements of low carbon and cleanness on power production increase day by day. Distributed clean and renewable energy source mainly including wind energy and solar energy is developing rapidly. The integration of a large number of distributed generation makes a conventional single-generation radial distribution network become a complex network with generations spread all over it, which not only changes a power flow distribution of a power grid, but also brings a series of influence on operation and control of the distribution network, for example, the aspects of node voltage of the power grid, power flow of the network, power quality, reliability of the power grid, loss of the network, spinning reserve and power dispatching.

The problems of Voltage and current violations caused by the increased capacity of distributed generation cannot be ignored. Overvoltage is the most common issue at the point of common coupling (PCC) for distributed generation (DG) units and the nearby grid area, which can lead to the disconnection of the distributed generators.

The installed capacity of a distributed power supply in China is relatively higher, and completely consuming renewable energy is the most important technical problem we must solve for power grid. One of main development targets of research on active distribution network technologies in recent years in China is to improve the distributed generation consumptive capability of power grid, and the hosting capacity of the power grid for distributed power supply is a problem distribution system operators are concerned about.

SUMMARY

In order to solve the existing technical problem, embodiments of the disclosure provide a method and device for determining capability of a feeder in accepting a distributed power source and a storage medium. Three-phase mutual inductance of the feeder, loss of the feeder and time-varying characteristic of load are comprehensively considered, a strong basis is provided for grid planning and operation control with the connection of distributed generator to the distribution network, and safety, economy and reliability of the distribution network including a large number of distributed generators are improved.

The embodiments of the disclosure provide a method for determining the capability of a feeder of a distribution network in terms of accepting a distributed power supply, which includes that:

S1: feeder loss is determined according to load information and line parameters of the feeder of the distribution network;

S2: voltage variations of three phases of a feeder line are determined according to the feeder loss;

S3: a maximum active power value of the distributed generation connected with the feeder under the voltage constraint is determined according to the voltage of a single-phase line with the maximum voltage variations;

S4: a feeder current corresponding to the maximum active power value of DG is compared with the thermal limit of the feeder to determine the capability of the feeder in terms of accepting the distributed power supply.

In the solution, the feeder loss is determined according to the load information and line parameters of the feeder of the distribution network in the step S1 includes that:

Information on active load and reactive load of different nodes on the feeder, self-impedance and mutual inductive impedance of the lines of the three phases and a voltage upper limit value $V_{upper}$ and maximum current limit value $I_{max}$ of the feeder are acquired, and the feeder loss is determined.

In the solution, a voltage between a node j+1 of the feeder connected with the distributed power supply and an adjacent node j is calculated according to a formula (1):

$$\begin{bmatrix} V_j^a \\ V_j^b \\ V_j^c \end{bmatrix} = \begin{bmatrix} V_{j+1}^a \\ V_{j+1}^b \\ V_{j+1}^c \end{bmatrix} + l_{j,j+1} * \begin{bmatrix} Z_{aa} & Z_{ab} & Z_{ac} \\ Z_{ba} & Z_{bb} & Z_{bc} \\ Z_{ca} & Z_{cb} & Z_{cc} \end{bmatrix} \begin{bmatrix} I_{j,j+1}^a \\ I_{j,j+1}^b \\ I_{j,j+1}^c \end{bmatrix} \quad (1)$$

where $V_j^a$, $V_j^b$ and $V_j^c$ are voltages of the three phases a, b and c at the node j respectively, $V_{j+1}^a$, $V_{j+1}^b$ and $V_{j+1}^c$ are voltages of the node j+1 of the three phases a, b and c respectively, $I_{j,j+1}^a$, $I_{j,j+1}^b$ and $I_{j,j+1}^c$ are currents of the three-phase lines between the node j and node j+1 respectively, $Z_{aa}$, $Z_{bb}$ and $Z_{cc}$ are self-impedance of a unit length between the lines of the three phases a, b and c respectively, $Z_{ab}$, $Z_{ac}$, $Z_{ba}$, $Z_{bc}$, $Z_{ca}$ and $Z_{cb}$ are mutual-impedance of the unit length between the lines of the three phases a, b and c respectively, and $l_{j,j+1}$ is a length between j and j+1 nodes.

In the solution, the feeder loss in the step S1 includes:

The apparent power loss, calculated according to a formula (2), of the lines of the three phases:

$$\begin{cases} S_{Loss,j}^a = (I_{Loss,j}^a Z_{aa} + I_{Loss,j}^b Z_{ab} + I_{Loss,j}^c Z_{ac}) \times (I_{Loss,j}^a)^* * l_{j,j+1} \\ S_{Loss,j}^b = (I_{Loss,j}^a Z_{ab} + I_{Loss,j}^b Z_{bb} + I_{Loss,j}^c Z_{bc}) \times (I_{Loss,j}^b)^* * l_{j,j+1} \\ S_{Loss,j}^c = (I_{Loss,j}^a Z_{ac} + I_{Loss,j}^b Z_{bc} + I_{Loss,j}^c Z_{cc}) \times (I_{Loss,j}^c)^* * l_{j,j+1} \end{cases} \quad (2)$$

where * represents the complex conjugate, and $S_{Loss,j}^a$, $S_{Loss,j}^b$ and $S_{Loss,j}^c$ are apparent power losses of lines between the nodes j and j+1 in the phase a, b and c respectively; and loss currents $I_{Loss,j}^a$, $I_{Loss,j}^b$ and $I_{Loss,j}^c$, calculated according to the formula (3), of the branch at between nodes j and j+1 of the phases a, b and c of the feeder:

$$I_{Loss,j}^a = \frac{\sum_{i=j+1}^{N} P_{Load,i} + J \sum_{j=i+1}^{N-1} Q_{Load,i}}{V_0} \angle 0° \quad (3)$$

$$I_{Loss,j}^b = \frac{\sum_{i=j+1}^{N} P_{Load,i} + J \sum_{j=i+1}^{N-1} Q_{Load,i}}{V_0} \angle -120°$$

$$I_{Loss,j}^c = \frac{\sum_{i=j+1}^{N} P_{Load,i} + J \sum_{j=i+1}^{N-1} Q_{Load,i}}{V_0} \angle 120°$$

where J is an imaginary unit, a real part represents line active power, an imaginary part represents line reactive power, $P_{Load,i}$ and $Q_{Load,i}$ are load active power and reactive power at ith node respectively, $V_0$ is a rated voltage of the feeder, and N is an end node of the feeder.

In the solution, voltage variations $\Delta U_{j,j+1}^a$, $\Delta U_{j,j+1}^b$ and $\Delta U_{j,j+1}^c$ between the nodes j and j+1 of the three-phase feeder are calculated according to a formula (4) in the step S2:

$$\Delta U_{j,j+1}^a = \text{real}(I_{j,j+1}^a Z_{aa} + I_{j,j+1}^b Z_{ab} + I_{j,j+1}^c Z_{ac}) * l_{j,j+1}$$

$$\Delta U_{j,j+1}^b = \text{real}(I_{j,j+1}^b Z_{bb} + I_{j,j+1}^a Z_{ba} + I_{j,j+1}^c Z_{bc}) * l_{j,j+1}$$

$$\Delta U_{j,j+1}^c = \text{real}(I_{j,j+1}^c Z_{cc} + I_{j,j+1}^a Z_{ca} + I_{j,j+1}^b Z_{cb}) * l_{j,j+1} \quad (4)$$

where real represents the real part of complex; and the currents $I_{j,j+1}^a$, $I_{j,j+1}^b$ and $I_{j,j+1}^c$ between the node j and node j+1 of the three-phase lines are calculated according to a formula (5) respectively:

$$I_{j,j+1} = \frac{P_{j+1,N} + JQ_{j+1,N}}{U_{j+1}} \quad (5)$$

where $U_{j+1}$ is a voltage at the node j+1, $P_{j+1,N}$ includes all the active loads and active losses in the branch between the nodes j+1 and N, $Q_{j+1,N}$ includes all the reactive loads and reactive losses in the branch between the nodes j+1 and N, J is an imaginary unit, and $P_{j+1,N}$ and $Q_{j+1,N}$ are calculated according to a formula (6):

$$P_{j+1,N} = \Sigma_{i=j+1}^{N} P_{Load,i} + \Sigma_{i=j+1}^{N-1} P_{Loss,i}$$

$$Q_{j+1,N} = \Sigma_{i=j+1}^{N} Q_{Load,i} + \Sigma_{i=j+1}^{N-1} Q_{Loss,i} \quad (6)$$

where $P_{Load,i}$ and $Q_{Load,i}$ represent the load active power and reactive power at node i respectively, and $P_{Loss,i}$ and $Q_{Loss,i}$ represent line active losses and reactive losses between nodes i and i+1 respectively.

In the solution, in the step S3, the voltage variations of the three-phase lines after the distributed power supply is connected with the feeder are compared to determine the single-phase line m with the maximum voltage variation, and a maximum voltage at a connection point of the feeder is represented according to a formula (7):

$$V_{upper} - V_0 = \Delta U_{1,2}^m + \Delta U_{2,3}^m + \ldots \Delta U_{j-1,j}^m + \Delta U_{j,j+1}^m \quad (7)$$

where m=a, b, c and is the single-phase line of the feeder, $\Delta U_{j,j+1}^m$ is a voltage variation between the nodes j and j+1 of the single-phase line m of the feeder, and j=1, 2, 3, ..., N−1, wherein a calculation formula for a current of the single-phase line m after the distributed power supply is connected is expressed as a formula (8):

$$I_{j,j+1}^m = \frac{\left(\sum_{i=j+1}^{N}(P_{dg,j+1}^m - P_{Load,i}^m) - \sum_{i=j+1}^{N-1} P_{Loss,i}^m\right) + J\left(\sum_{i=j+1}^{N} Q_{Load,i}^m + \sum_{i=j+1}^{N-1} Q_{Loss,i}^m\right)}{V_0} \quad (8)$$

in the formula, $P_{dg,j+1}^m$ is the active power of the distributed power supply connected at the node j+1 of the single-phase line m, $P_{Load,i}^m$ and $Q_{Load,i}^m$ are the load active power and reactive power at the node i of the single-phase line m respectively and $P_{Loss,i}^m$ and $Q_{Loss,i}^m$ are load active loss and reactive loss at the node i of the single-phase line m respectively; and $P_{dg,j+1°}^m$ can be calculated by substituting the formulae (4) and (8) into the formula (7) respectively, and the maximum active power value of the distributed power supply connected at the node j+1 of the feeder is: $V=3 \times P_{dg, j+1°}^m$.

In the solution, the current value $I_{j,j+1}^{m'}$ of the distributed power supply is calculated according to a formula (9) in the step S4:

$$I_{j,j+1}^{m*} = \frac{\sqrt{(\sum_{i=j+1}^{N}(P_{dg,j+1}^m - P_{Load,i}^m))^2 + (\sum_{i=j+1}^{N} Q_{Load,i}^m)^2}}{U_{j+1}} \quad (9)$$

where $U_{j+1}$ is the voltage at the node j+1, and $P_{Load,i}^m$ and $Q_{Load,i}^m$ are the load active power and reactive power at the node i of the single-phase line m respectively.

In the solution, the maximum capability of the feeder in terms of accepting the distributed power supply is determined as follow:

the maximum capability of the feeder in terms of accepting the distributed power supply is determined according to the maximum active power value of DG, and the current value $I_{j,j+1}^{m*}$ is compared with the maximum current limit value $I_{max}$ of the feeder to determine the maximum active power value of the DG connected to the feeder:

1) if $I_{j,j+1}^{m*} < I_{max}$, the maximum capacity of the DG connected to the feeder is $V=3 \times P_{dg, j+1°}^m$; or, 2) if $I_{j,j+1}^{m*} > I_{max}$, the maximum capacity $P_{dg,j+1}^{m*}$ of the DG connected to the feeder is calculated according to a formula (10):

$$I_{max} = \frac{\sqrt{(\sum_{i=j+1}^{N}(P_{dg,j+1}^{m*} - P_{Load,i}^m))^2 + (\sum_{i=j+1}^{N} Q_{Load,i}^m)^2}}{V_0}, \quad (10)$$

the capability of the feeder line in accepting the DG is $V^* = 3 \times P_{dg, j+1°}^{m*}$.

The embodiments of the disclosure further provide a device for determining a capability of a feeder of a distribution network in terms of accepting a distributed power supply, which includes:

a feeder information acquisition unit, configured to determine feeder loss according to load information and line information at the nodes of the feeder of the distribution network;

a voltage drop unit, configured to determine voltage variations of three-phase feeder according to the feeder loss;

a quantitative calculation unit, configured to determine a maximum active power value of the DG connected with the feeder under voltage constraint according to the voltage of single-phase line with a maximum variation; and a result analysis unit, configured to compare a feeder current corresponding to the maximum active power value with the thermal limit of the feeder to determine the capability of the feeder in terms of accepting the DG.

In the solution, the feeder information acquisition unit acquires information of active load and reactive load at different nodes of the feeder, self-impedance and mutual-impedance of the three-phase lines and upper voltage limit value $V_{upper}$ and maximum current limit value of the feeder $I_{max}$.

In the solution, the result analysis unit is configured to compare the current value corresponding to the maximum active power value of the DG under the voltage constraint with the current limit value of the feeder, and when the current value exceeds the current limit of the feeder, calculate the maximum active power value of the DG according to the current limit value of the feeder.

The embodiments of the disclosure further provide a device for determining the capability of a feeder of distribution network in terms of accepting the DG, which includes: a processor and a memory having stored the executable computer program on the processor, wherein the processor is configured to run the computer program to execute the steps of the abovementioned method.

The embodiments of the disclosure further provide a computer-readable storage medium having stored thereon a computer program that when executed by a processor, causes the processor to perform the steps of the abovementioned method.

According to the technical solutions provided by the embodiments of the disclosure, an active power value of the DG accepted by the feeder may be rapidly and accurately calculated using the line parameters and loads of a power grid, so that efficiency of calculation is improved; and a calculation result may be used for planning and operation control of the DG, and ensures the safe connection and control of the DG and safe operation of the power grid, and also improves the DG capacity of the distribution network.

DETAILED DESCRIPTION

When determining the capability of a feeder in accepting the DG, the power flow simulation calculation method is usually adopted, while the modeling for simulation is required to be performed according to a specific condition, and the obtained result is required to be determined by using a try-and-error repetitive power flow calculation, which is usually time-consuming. Thus it is difficult to be implemented in the application of DG's dispatching and operation control in power grid. In addition, the capacity for accepting the DG is directly related to the load on the feeder and line impedance, the load is usually analyzed by adopting a single-point fixed value method during analysis of the capability of accepting the DG. The capability for accepting the DG have time-varying characteristic due to the time-varying characteristic of the load, so that the calculation result of the maximum generation capability of DG in the distribution feeder, obtained under the extreme condition without considering the factor of the load change, is conservative, and the potential of DG cannot be fully developed and utilized. Therefore, there is an urgent need for a method and device for rapidly and accurately determining the capability of the feeder of a distribution network in terms of accepting the DG and a storage medium.

Here, in order to make the characteristics and technical contents of the disclosure understood in more detail, implementation of the disclosure will be described below in combination with the drawings in detail. The appended drawings are only adopted for descriptions as references and not intended to limit the disclosure.

The embodiments of the disclosure provide a quantitative calculation method for determining the capability of the feeder of the distribution network in terms of accepting the DG under a steady state constraint for certain node of the feeder of the distribution network. According to the method, three-phase mutual-inductance of the feeder, loss of the feeder and the time-varying characteristic of load are comprehensively considered, a strong basis can be provided for planning and operation control of DG in distribution network, and it also improves the safety, economy and reliability of the distribution network with DG integration.

Figure 2:
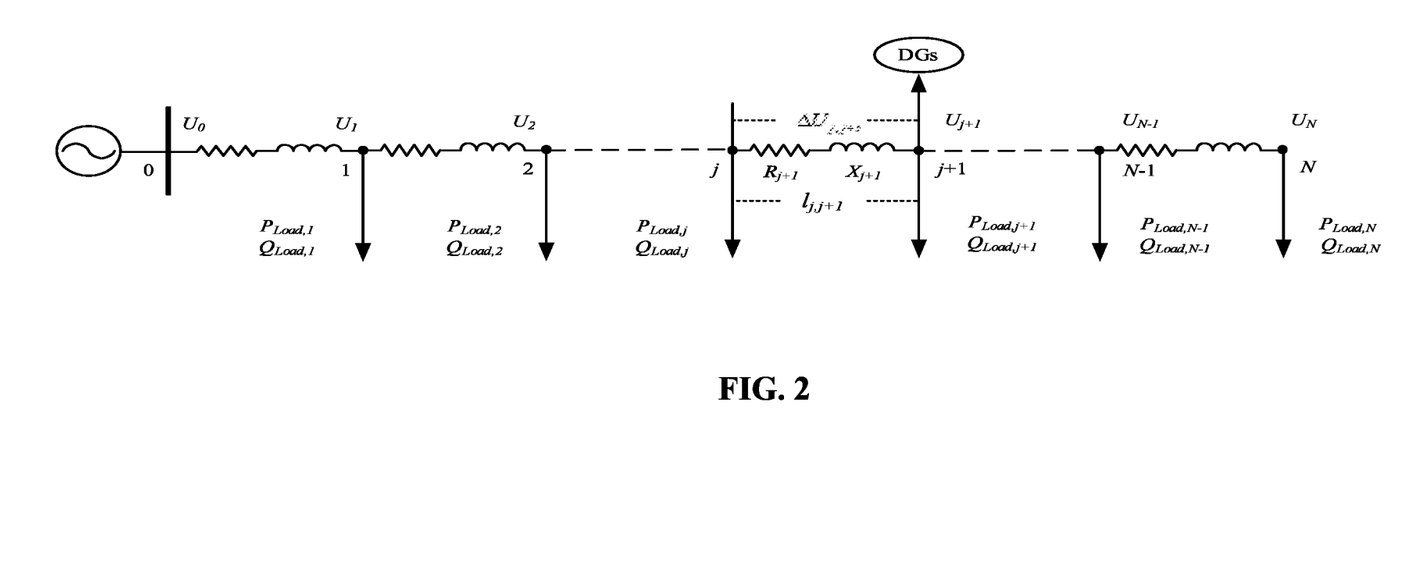
FIG. 2 is a schematic diagram of connection of DG to a feeder according to an embodiment of the disclosure.

According to the calculation method disclosed by the embodiments of the disclosure for the capability of the feeder in terms of accepting the DG, the capability of DG in the feeder of the distribution network may be accurately reflected. FIG. 2 shows a schematic diagram of connection of DG to the feeder. It is assumed that there are totally N nodes on a three-phase main feeder in the distribution network, the loads are connected to three phases of each node respectively, and in the figure, the node 0 represents a distribution bus. The calculation method mainly includes three key steps: analysis of voltage variations of three-phase feeder, calculation of line loss and voltage drop. At first, the voltage variation of the node where the DG is connected is calculated through active power injected by the DG with considering the feeder loss and mutual-inductance parameters of three-phase lines. Duo to the mutual-inductance parameters of the three-phase lines, the voltages variations of the phase A, phase B and phase C of the feeder are different even though the three-phase feeder is connected with the same load. By this step, the phase with a maximum voltage increase in the three phases with DG integration is determined. Then, for the phase determined in the previous step, the active and reactive power losses between node 0 and node where the DG is connected are calculated according to the loads and line parameters of the three-phase feeder. Finally, the voltage drop between the node 0 and node where the DG is connected is calculated according to the active loads and reactive loads of the feeder and the active and reactive power loss of the lines. Considering the steady-state voltage constraint, the maximum active power value of DG connected to the node can be calculated through a voltage drop formula. Meanwhile, considering the constraint of thermal limit of the line, the maximum active power value of the DG connected to the node also can be calculated. The minimum value of them is the maximum active power value of the DG accepted by the feeder node.

Figure 1:
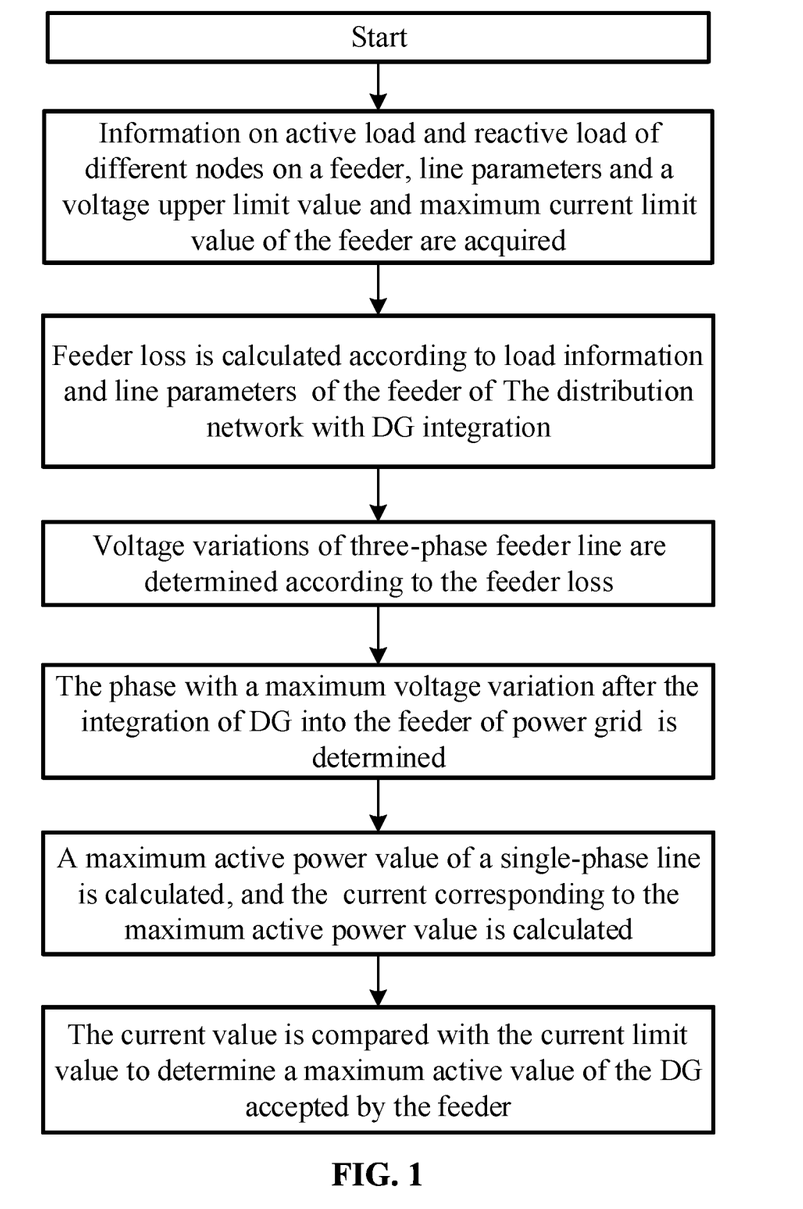
FIG. 1 is a flowchart of a calculation method according to an embodiment of the disclosure.

A flow of the calculation method is provided by the embodiments of the disclosure for the capability for accepting the DG under the steady state constraint, as shown in FIG. 1, specifically includes the following steps.

(I) A node position at which a DG is connected to in the feeder is selected, and load information at different nodes in the feeder, line parameters and a upper voltage limit value $V_{upper}$ and maximum current limit value $I_{max}$ of the feeder are collected, wherein the load information includes active loads and reactive loads at the nodes, and the line parameters include self-impedance and mutual-impedance of three-phase lines.

It is set that the node position at which the DG is connected to in the feeder is j+1, and an equation for calculating a voltage drop between two adjacent nodes j and j+1 of the feeder in consideration of mutual inductance between feeders according to a Kirchhoff Voltage Law (KVL) is as follows:

$$\begin{bmatrix} V_j^a \\ V_j^b \\ V_j^c \end{bmatrix} = \begin{bmatrix} V_{j+1}^a \\ V_{j+1}^b \\ V_{j+1}^c \end{bmatrix} + l_{j,j+1} * \begin{bmatrix} Z_{aa} & Z_{ab} & Z_{ac} \\ Z_{ba} & Z_{bb} & Z_{bc} \\ Z_{ca} & Z_{cb} & Z_{cc} \end{bmatrix} \begin{bmatrix} I_{j,j+1}^a \\ I_{j,j+1}^b \\ I_{j,j+1}^c \end{bmatrix}, \quad (1)$$

In the formula, $V_j^a$, $V_j^b$ and $V_j^c$ are voltages of the three phases at the node j respectively, $I_{j,j+1}^a$, $I_{j,j+1}^b$ and $I_{j,j+1}^c$ are currents of the three-phase lines between the node j and node j+1 respectively, $Z_{aa}$, $Z_{bb}$ and $Z_{cc}$ are self-impedance of a unit length of the three phases respectively, $Z_{ab}$, $Z_{ac}$, $Z_{ba}$, $Z_{bc}$, $Z_{ca}$ and $Z_{cb}$ are mutual impedance of the unit length between the three phases and $l_{j,j+1}$ is a length between node j and j+1. For the single phase, the array of mutual impedance is 0.

(II) If the DG is connected to the node j+1, considering mutual inductance of the three-phase feeder, active power loss and reactive power loss of each segment of line in the feeder are calculated.

Figure 3:
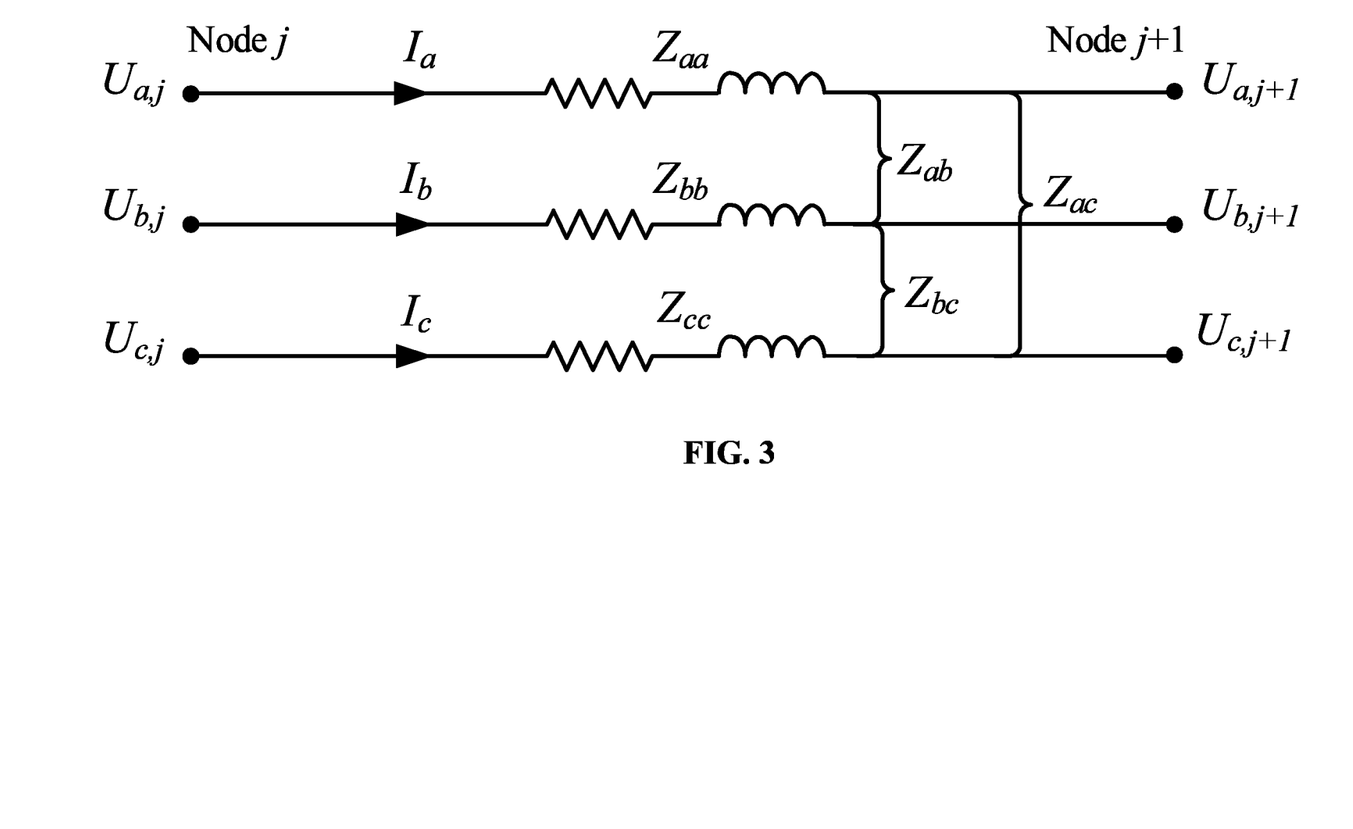
FIG. 3 is a three-phase feeder model according to an embodiment of the disclosure.

As shown in the three-phase feeder model in FIG. 3, the three-phase feeder model includes self-inductance and mutual-inductance of the three phases. It is assumed that the distribution node voltage of the feeder is $V_0$, the upper voltage limit $V_{upper}$ of the feeder is generally an increase of 5% compared to the rated voltage. When the line loss between adjacent nodes of the feeder is calculated, the voltage drop and angle of each node may be neglected, thus the voltage can use $V_0 \angle 0$ for loss calculation.

The apparent power losses of the three-phase lines is calculated according to the formula (2):

$$\begin{cases} S_{Loss,j}^a = (I_{Loss,j}^a Z_{aa} + I_{Loss,j}^b Z_{ab} + I_{Loss,j}^c Z_{ac}) \times (I_{Loss,j}^a)^* * l_{j,j+1} \\ S_{Loss,j}^b = (I_{Loss,j}^a Z_{ab} + I_{Loss,j}^b Z_{bb} + I_{Loss,j}^c Z_{bc}) \times (I_{Loss,j}^b)^* * l_{j,j+1} \\ S_{Loss,j}^c = (I_{Loss,j}^a Z_{ac} + I_{Loss,j}^b Z_{bc} + I_{Loss,j}^c Z_{cc}) \times (I_{Loss,j}^c)^* * l_{j,j+1} \end{cases} \quad (2)$$

in the formula, * represents the complex conjugate, and $S_{Loss,j}^a$, $S_{Loss,j}^b$ and $S_{Loss,j}^c$ are apparent power losses of the three phases respectively;

The loss currents $I_{Loss,j}^a$, $I_{Loss,j}^b$ and $I_{Loss,j}^c$ of the three phases of the feeder are calculated according to the formula (3) respectively:

$$I_{Loss,j}^a = \frac{\sum_{i=j+1}^{N} P_{Load,i} + J \sum_{j=i+1}^{N-1} Q_{Load,i}}{V_0} \angle 0° \quad (3)$$

$$I_{Loss,j}^b = \frac{\sum_{i=j+1}^{N} P_{Load,i} + J \sum_{j=i+1}^{N-1} Q_{Load,i}}{V_0} \angle -120°$$

$$I_{Loss,j}^c = \frac{\sum_{i=j+1}^{N} P_{Load,i} + J \sum_{j=i+1}^{N-1} Q_{Load,i}}{V_0} \angle 120°,$$

where J is an imaginary unit, a real part represents line active power, and an imaginary part represents line reactive power; and the active loss $P_{Loss,i}^a$ and reactive loss $Q_{Loss,i}^a$ of the line of the phase a are shown in the following formula (4):

$$P_{Loss,j}^a = \text{real}(S_{Loss,j}^a)$$

$$Q_{Loss,j}^a = \text{imag}(S_{Loss,j}^a) \quad (4),$$

in the formula, real and imag represent real and imaginary part of complex respectively.

(III) A voltage variation of each segment of line of the feeder is calculated according to the calculated line active and reactive losses.

Figure 4:
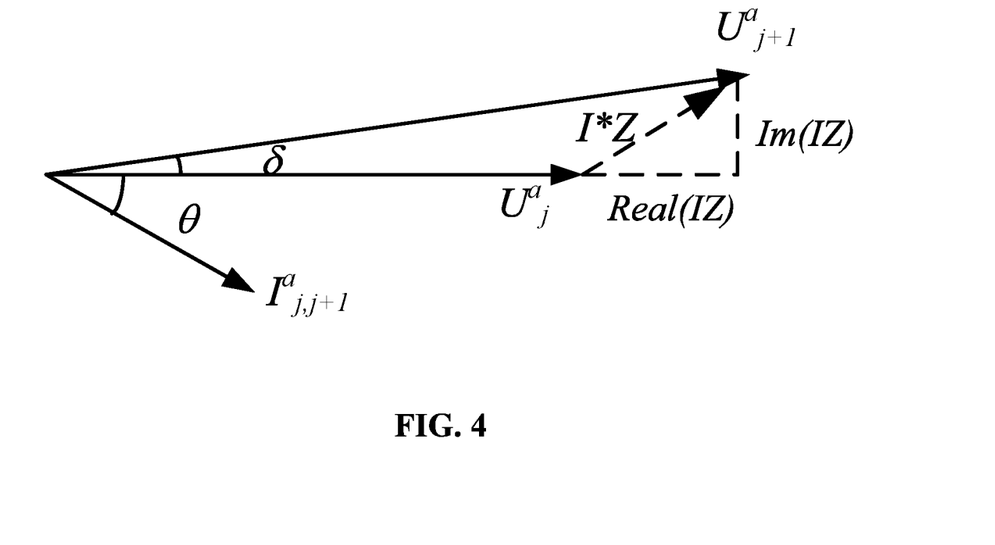
FIG. 4 is a phasor diagram of voltage according to an embodiment of the disclosure.

As shown in the diagram of voltage vectors between the nodes j and j+1 in FIG. 4, the angle between the different nodal voltage of the feeder is very small, thus the voltage drop between the successive nodes can be approximately equal to the real part of the impedance drop, and the voltage variation of each phase is calculated according to the formula (5):

$$\Delta U_{j,j+1}^a = \text{real}(I_{j,j+1}^a Z_{aa} + I_{j,j+1}^b Z_{ab} + I_{j,j+1}^c Z_{ac}) * l_{j,j+1}$$

$$\Delta U_{j,j+1}^b = \text{real}(I_{j,j+1}^a Z_{ba} + I_{j,j+1}^b Z_{ba} + I_{j,j+1}^c Z_{bc}) * l_{j,j+1}$$

$$\Delta U_{j,j+1}^c = \text{real}(I_{j,j+1}^a Z_{cc} + I_{j,j+1}^b Z_{ca} + I_{j,j+1}^c Z_{cb}) * l_{j,j+1} \quad (5),$$

In the formula, $\Delta U_{j,j+1}^a$, $\Delta U_{j,j+1}^b$ and $\Delta U_{j,j+1}^c$ are the voltage drops between adjacent nodes j and j+1 of the three phases.

The currents $I_{j,j+1}^a$, $I_{j,j+1}^b$ and $I_{j,j+1}^c$ between the nodes j and j+1 can be determined by the active and reactive power of the lines and the voltage at the node j+1, and are calculated according to a formula (6):

$$I_{j,j+1} = \frac{P_{j+1,N} + JQ_{j+1,N}}{U_{j+1}}, \quad (6)$$

in the formula, $P_{j+1,N}$ includes all the active loads and active losses in the branch between the nodes j+1 and N, $Q_{j+1,N}$ includes all the reactive loads and reactive losses in the branch between the nodes j+1 and N and $U_{j+1}$ is the voltage at the node j+1, wherein $P_{j+1,N}$ and $Q_{j+1,N}$ are calculated according to a formula (7) respectively:

$$P_{j+1,N} = \Sigma_{i=j+1}^{N} P_{Load,i} \Sigma_{i=j+1}^{N-1} P_{Loss,i}$$

$$Q_{j+1,N} \Sigma_{i=j+1}^{N} Q_{Load,i} \Sigma_{i=j+1}^{N-1} Q_{Loss,i} \quad (7),$$

in the formula, $P_{Load,i}$ and $Q_{Load,i}$ represent the load active power and reactive power at node i respectively, and $P_{Loss,i}$ and $Q_{Loss,i}$ represent line active loss and reactive loss between nodes i and i+1 respectively.

(IV) The calculated voltage variation of each phase after the distributed power supply is connected to the feeder is compared to determine the phase with a maximum variation, and for the single phase with the maximum voltage variation, a maximum generation capacity of the DG at the connection node is calculated under the voltage constraint according to a formula (8).

Under the normal condition, the DG are connected at different nodes of the feeder under power factor control manner, and operates at a relatively higher power factor. Therefore, in the embodiments of the disclosure, the DG is considered as an active power source. After the DG connects to the distribution network, the voltage of each node in the feeder will be increased, and continuous increase of output power of the DG may make the voltage of the node exceed the limit ($V>V_{upper}$). When the voltage of a certain phase of the three-phase feeder exceeds the limit, it means that a corresponding output value of the DG is the maximum capability of the node for accepting DG at this moment. After the DG connects to the node of the feeder, its output power of the three phases is balanced. However, the line parameters of the three phases of the feeder are different, so that output of the DG increases the voltages of the three phases of the feeder to different extents, and when the maximum capability of DG in the feeder is calculated, the phase with the maximum voltage increase should be taken as a reference.

It is assumed that the DG connects to the node j+1, a certain output power value $P_{dg,j+1}$ of the DG is given, the voltage variation of the node compared to voltage of distribution bus is calculated according to the above formula, and the phase with the maximum voltage increase of the three phases of the feeder is obtained by comparison. If the result is determined to be that the phase A has the maximum voltage increase, and the voltage drop between the node 0 and the node j+1 where the DG is connected to can be calculated according to a formula (8):

$$V_{upper} - V_0 = \Delta U^a_{1,2} + \Delta U^a_{2,3} + \ldots \Delta U^a_{j-1,j} + \Delta U^a_{j,j+1} \quad (8)$$

where $V_0$ is the voltage of distribution bus;

$$\Delta U^a_{j,j+1} = \text{real}(I^a_{j,j+1} Z_{aa} + I^b_{j,j+1} Z_{ab} + I^c_{j,j+1} Z_{ac}) * l_{j,j+1}, \text{ and} \quad (9)$$

$$I^a_{j,j+1} = \frac{\left(\sum_{i=j+1}^{N}(P^a_{dg,j+1} - P^a_{Load,i}) - \sum_{i=j+1}^{N-1} P^a_{Loss,i}\right) + j\left(\sum_{i=j+1}^{N} Q^a_{Load,i} + \sum_{i=j+1}^{N-1} Q^a_{Loss,i}\right)}{V_0}, \quad (10)$$

in the formula, $V_{upper}$, $V_0$, $Z_{aa}$, $Z_{ab}$ and $Z_{ac}$ are known quantities, $I_{j,j+1}{}^a$, $I_{j,j+1}{}^b$ and $I_{j,j+1}{}^c$ are the symmetric currents of the three phases and $P_{dg,j+1}{}^a$ is the maximum power value of the DG connected to the phase A at the node j+1; and $P_{dg,j+1}{}^a$ can be calculated by substituting the formulae (9) and (10) into the formula (8) respectively, and the value is multiplied by 3 to obtain the maximum generation capacity of the DG connected to the node j+1.

(V) The current value $I_{j,j+1}{}^{a*}$ corresponding to the maximum active power value of the DG is calculated according to the formula (11), and the value of $I_{j,j+1}{}^{a*}$ is compared with the thermal limit value $I_{max}$ of the line. When $I_{j,j+1}{}^{a*} < I_{max}$, the maximum generation capability of the DG in the feeder may be determined according to the result obtained by Step 4. On the contrary, the result is recalculated according to the formula (12).

The calculated maximum active power value is obtained by considering the voltage constraint but not considering the constraint of thermal limit of the line. When the DG is connected to the node j+1, a maximum current of the line, namely, $I_{j,j+1}{}^{a*}$, may appear in the branch between the node j and the node j+1, and the approximate expression is as follows:

$$I^{a*}_{j,j+1} = \frac{\sqrt{\left(\sum_{i=j+1}^{N}(P^a_{dg,j+1} - P^a_{Load,i})\right)^2 + \left(\sum_{i=j+1}^{N} Q^a_{Load,i}\right)^2}}{U_{j+1}} \quad (11)$$

According to the thermal limit $I_{max}$ of the line, set $U_{j+1}$ to $V_0$, and the maximum active power value of the DG connected at the node may be calculated according to the formula (12):

$$I_{max} = \frac{\sqrt{\left(\sum_{i=j+1}^{N}(P^{a*}_{dg,j+1} - P^a_{Load,i})\right)^2 + \left(\sum_{i=j+1}^{N} Q^a_{Load,i}\right)^2}}{V_0}, \quad (12)$$

and

Then, the maximum active power value of the DG connected to the feeder is $V^* = 3 \times P_{dg,j+1}{}^{a*}$.

According to the technical solutions provided by the embodiments of the disclosure, an active power value of the DG accepted by the feeder may be rapidly and accurately calculated according to the parameters and loads of feeder of distribution network, so that efficiency of calculation is improved; and the calculation result may be used for the planning and operation control of the DG, which ensures the safe integration and control of the DG and safe operation of the power grid and improve the DG consumptive capacity of the distribution network. Moreover, in the embodiments of the disclosure, the three-phase mutual inductance of the feeder, the losses of the feeder and the time-varying characteristic of the load are comprehensively considered, a strong basis can be provided for planning and operation control of DG in distribution network, and it also improves the safety, economy and reliability of the distribution network with DG integration.

The embodiments of the disclosure further provide a device for determining the maximum generation capability of DG in the feeder of distribution network, which includes:

a feeder information acquisition unit, configured to determine feeder loss according to load information and line information of the feeder of the distribution network;

a voltage drop unit configured to determine voltage variations of three phases of the feeder according to the feeder loss;

a quantitative calculation unit configured to determine a maximum active power value of the DG connected to the feeder under the voltage constraint according to the voltage of single-phase line with a maximum variation; and a result analysis unit configured to compare a feeder current corresponding to the maximum active power value with the thermal limit of the feeder to determine the capability of the DG accepted by the feeder.

In the solution, the feeder information acquisition unit acquires information of active load and reactive load at different nodes of the feeder, self-impedance and mutual-impedance of the three-phase lines and upper voltage limit value $V_{upper}$ and thermal limit of the feeder $I_{max}$ In the solution, the result analysis unit is configured to compare the current value corresponding to the maximum active power value of the DG under voltage constraint with the thermal limit of the feeder, and when the current value exceeds the current limit value of the feeder, calculate the maximum active power value of the DG according to the current limit value of the feeder.

Here, the feeder information acquisition unit, the voltage drop unit, the quantitative calculation unit and the result analysis unit may all be implemented by a Central Processing Unit (CPU), or a Micro Processor Unit (MPU), or a Digital Signal Processor (DSP) or a Field Programmable Gate Array (FPGA).

The embodiments of the disclosure further provide a device for determining the capability of a feeder of distribution network in terms of accepting the DG, which includes: a processor and a memory having stored the executable computer program on the processor, wherein the processor is configured to run the computer program to execute the steps of the abovementioned method.

Here, the processor may be an integrated circuit chip, and has a signal processing capability. During an implementation process, each step of the abovementioned method may be implemented through an integrated logic circuit of hardware in the processor or an instruction in form of software. The processor may be a universal processor, a DSP, or another programmable logical device, discrete gate or transistor logical device, discrete hardware component and the like. The processor may implement or execute each method, step and logical block diagram disclosed in the embodiments of the disclosure. The universal processor may be a microprocessor or any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a storage medium, the storage medium is located in a memory, and the processor reads information in the memory, and completes the steps of the methods in combination with hardware.

It is important to point out here that: the above descriptions about the device embodiment are similar to the descriptions about the method embodiment, have beneficial effects similar to the method embodiment, and thus will not be elaborated. Technical details not disclosed in the device embodiment of the disclosure are understood with reference to the descriptions about the method embodiment of the disclosure, and thus will not be elaborated to save the space.

The embodiments of the disclosure further provide a computer-readable storage medium, for example, a memory including a computer program, and the computer program may be executed by a processor of a device for determining a capability of a feeder of a distribution network in terms of accepting a distributed power supply to implement the abovementioned method or steps. The computer-readable storage medium may be a memory such as a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a flash memory, a magnetic surface memory, an optical disk or a Compact Disc Read-Only Memory (CD-ROM), and may also be various kinds of equipment including one of any combination of the memories.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, a CD-ROM and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above embodiments are adopted to not limit but only describe the technical solutions of the disclosure. Although the disclosure has been described with reference to the embodiments in detail, those skilled in the art may still make modifications or equivalent replacements to specific implementation modes of the disclosure, and any modifications or equivalent replacements made without departing from the spirit and scope of the disclosure shall fall within the scope of the claims of the disclosure applying for approval.

INDUSTRIAL APPLICABILITY

According to the embodiments of the disclosure, the active power value of the DG accepted by the feeder may be rapidly and accurately calculated according to the line parameters and loads of the power grid, so that the efficiency of calculation is improved; and the calculation result may be used for planning and operation control of the DG, which ensures the safe integration and control of the DG and safe operation of the power grid and improve the DG consumptive capacity of the distribution network. Moreover, in the embodiments of the disclosure, the three-phase mutual inductance of the feeder, the losses of the feeder and the time-varying characteristic of the load are comprehensively considered, a strong basis can be provided for planning and operation control of DG in distribution network, and it also improves the safety, economy and reliability of the distribution network with DG integration.

The invention claimed is:

1. A method for determining a capability of a feeder of distribution network in terms of accepting distributed generation (DG), comprising steps of:
   S1, determining feeder loss according to load information and line parameters of the feeder of the distribution network;
   S2, determining voltage variations of three-phase feeder line according to the feeder loss;
   S3, determining a maximum active power value of the DG connected with the feeder under a voltage constraint according to a voltage of a single-phase line with a maximum voltage variations; and
   S4, comparing a feeder current corresponding to the maximum active power value with a thermal limit of the feeder to determine the capability of the feeder in terms of accepting the DG, using the capability of the feeder in terms of accepting the DG for planning and operation control of the DG to ensure safe connection and control of the DG and safe operation of the distribution network,
   wherein a voltage between a node j+1 of the feeder connected with the DG and an adjacent node j is calculated according to a formula (1):

$$\begin{bmatrix} V_j^a \\ V_j^b \\ V_j^c \end{bmatrix} = \begin{bmatrix} V_{j+1}^a \\ V_{j+1}^b \\ V_{j+1}^c \end{bmatrix} + l_{j,j+1} * \begin{bmatrix} Z_{aa} & Z_{ab} & Z_{ac} \\ Z_{ba} & Z_{bb} & Z_{bc} \\ Z_{ca} & Z_{cb} & Z_{cc} \end{bmatrix} \begin{bmatrix} I_{j,j+1}^a \\ I_{j,j+1}^b \\ I_{j,j+1}^c \end{bmatrix} \quad (1)$$

where $V_j^a$, $V_j^b$ and $V_j^c$ are voltages of the three phases a, b and c at the node j respectively, $V_{j+1}^a$, $V_{j+1}^b$ and $V_{j+1}^c$ are voltages of the node j+1 of the three phases a, b and c respectively, $I_{j,j+1}^a$, $I_{j,j+1}^b$ and $I_{j,j+1}^c$ are currents of the three-phase lines between the node j and node j+1 respectively, $Z_{aa}$, $Z_{bb}$ and $Z_{cc}$ are self-impedance of a unit length between the lines of the three phases a, b and c respectively, $Z_{ab}$, $Z_{ac}$, $Z_{ba}$, $Z_{bc}$, $Z_{ca}$ and $Z_{cb}$ are mutual inductive impedance of the unit length between the lines of the three phases a, b and c respectively, and $l_{j,j+1}$ is a length between the node j and the adjacent node j+1.

2. The method according to claim 1, wherein determining the feeder loss according to the load information and line parameters of the feeder of the distribution network in the step S1 comprises:
   acquiring information of active load and reactive load at different nodes on the feeder, self-impedance and mutual-impedance of the three-phase lines and upper voltage limit value $V_{upper}$ and maximum current limit value $I_{max}$ of the feeder to determine the feeder loss.

3. The method according to claim 1, wherein the feeder loss in the step S1 comprises:
   the apparent power loss, calculated according to a formula (2), of the lines of the three phases:

$$\begin{cases} S_{Loss,j}^a = (I_{Loss,j}^a Z_{aa} + I_{Loss,j}^b Z_{ab} + I_{Loss,j}^c Z_{ac}) \times (I_{Loss,j}^a)^* * l_{j,j+1} \\ S_{Loss,j}^b = (I_{Loss,j}^a Z_{ab} + I_{Loss,j}^b Z_{bb} + I_{Loss,j}^c Z_{bc}) \times (I_{Loss,j}^b)^* * l_{j,j+1} \\ S_{Loss,j}^c = (I_{Loss,j}^a Z_{ac} + I_{Loss,j}^b Z_{bc} + I_{Loss,j}^c Z_{cc}) \times (I_{Loss,j}^c)^* * l_{j,j+1} \end{cases} \quad (2)$$

where * represents a complex conjugate, and $S_{Loss,j}^a$, $S_{Loss,j}^b$ and $S_{Loss,j}^c$ are apparent power losses of lines between the nodes j and j+1 in the phases a, b and c respectively; and loss currents $I_{Loss,j}^a$, $I_{Loss,j}^b$ and $I_{Loss,j}^c$, calculated according to a formula (3), of the branch between nodes j and j+1 of the phases a, b and c:

$$I_{Loss,j}^a = \frac{\sum_{i=j+1}^{N} P_{Load,i} + J \sum_{j=i+1}^{N-1} Q_{Load,i}}{V_0} \angle 0° \quad (3)$$

$$I_{Loss,j}^b = \frac{\sum_{i=j+1}^{N} P_{Load,i} + J \sum_{j=i+1}^{N-1} Q_{Load,i}}{V_0} \angle -120°$$

$$I_{Loss,j}^c = \frac{\sum_{i=j+1}^{N} P_{Load,i} + J \sum_{j=i+1}^{N-1} Q_{Load,i}}{V_0} \angle 120°$$

where J is an imaginary unit, a real part represents line active power, an imaginary part represents line reactive power, $P_{Load,i}$ and $Q_{Load,i}$ are load active power and reactive power at $i^{th}$ node respectively, $V_0$ is a rated node voltage of the feeder, and N is an end node of the feeder.

4. The method according to claim 1, wherein voltage variations $\Delta U_{j,j+1}^a$, $\Delta U_{j,j+1}^b$ and $\Delta U_{j,j+1}^c$ between the nodes j and j+1 of the three-phase feeder are calculated according to a formula (4) in the step S2:

$$\Delta U_{j,j+1}^a = \text{real}(I_{j,j+1}^a Z_{aa} + I_{j,j+1}^b Z_{ab} + I_{j,j+1}^c Z_{ac}) * l_{j,j+1}$$

$$\Delta U_{j,j+1}^b = \text{real}(I_{j,j+1}^b Z_{bb} + I_{j,j+1}^a Z_{ba} + I_{j,j+1}^c Z_{bc}) * l_{j,j+1}$$

$$\Delta U_{j,j+1}^c = \text{real}(I_{j,j+1}^c Z_{cc} + I_{j,j+1}^a Z_{ca} + I_{j,j+1}^b Z_{cb}) * l_{j,j+1} \quad (4)$$

where real represents a real part of complex; and the currents $I_{j,j+1}^a$, $I_{j,j+1}^b$ and $I_{j,j+1}^c$ between the node j and node j+1 of three-phase lines are calculated according to a formula (5) respectively:

$$I_{j,j+1} = \frac{P_{j+1,N} + JQ_{j+1,N}}{U_{j+1}} \quad (5)$$

where $U_{j+1}$ is a voltage at the node j+1, $P_{j+1,N}$ includes all the active loads and active losses in the branch between the nodes j+1 and N, $Q_{j+1,N}$ includes all the reactive loads and reactive losses in the branch between the nodes j+1 and N, J is an imaginary unit, and $P_{j+1,N}$ and $Q_{j+1,N}$ are calculated according to a formula (6):

$$P_{j+1,N} = \Sigma_{i=j+1}^{N} P_{Load,i} + \Sigma_{i=j+1}^{N-1} P_{Loss,i}$$

$$Q_{j+1,N} = \Sigma_{i=j+1}^{N} Q_{Load,i} + \Sigma_{i=j+1}^{N-1} Q_{Loss,i} \quad (6)$$

where $P_{Load,i}$ and $Q_{Load,i}$ represent the load active power and reactive power at the node i respectively, and $P_{Loss,i}$ and $Q_{Loss,i}$ represent line active loss and reactive loss between nodes i and i+1 respectively.

5. The method according to claim 1, wherein, in the step S3, the voltage variations of the three-phase lines after the DG is connected with the feeder are compared to determine the single-phase line m with the maximum voltage variation, and a voltage drop between a first node the single-phase line m in the feeder and the node where the DG is connected is represented according to a formula (7):

$$V_{upper} - V_0 = \Delta U^m_{1,2} + \Delta U^m_{2,3} + \ldots \Delta U^m_{j-1,j} + \Delta U^m_{j,j+1} \quad (7)$$

where m=a, b, c and represents the single-phase line of the feeder, $\Delta U^m_{j,j+1}$ is a voltage variation between the nodes j and j+1 of the single-phase line m of the feeder, and j=1, 2, 3, . . . , N−1, wherein a calculation formula for a current of the single-phase line m after the DG is connected with the single-phase line is expressed as a formula (8):

$$I^m_{j,j+1} = \frac{\left(\sum_{i=j+1}^{N}(P^m_{dg,j+1} - P^m_{Load,i}) - \sum_{i=j+1}^{N-1} P^m_{Loss,i}\right) + J\left(\sum_{i=j+1}^{N} Q^m_{Load,i} + \sum_{i=j+1}^{N-1} Q^m_{Loss,i}\right)}{V_0} \quad (8)$$

where $P^m_{dg,j+1}$ represents an active power of the distributed power supply connected at the node j+1 of the single-phase line m, $P^m_{Load,i}$ and $Q^m_{Load,i}$ represent load active power and reactive power at the node i of the single-phase line m respectively and $P^m_{Loss,i}$ and $Q^m_{Loss,i}$ represent load active loss and reactive loss at the node i of the single-phase line m respectively; and the maximum active power value of the distributed power supply connected at the node j+1 of the feeder is: $V=3 \times P^m_{dg,j+1}$.

6. The method according to claim 1, wherein a current value $I^{m*}_{j,j+1}$ of the DG is calculated according to a formula (9) in the step S4:

$$I^{m*}_{j,j+1} = \frac{\sqrt{\left(\sum_{i=j+1}^{N}(P^m_{dg,j+1} - P^m_{Load,i})\right)^2 + \left(\sum_{i=j+1}^{N} Q^m_{Load,i}\right)^2}}{U_{j+1}} \quad (9)$$

where $U_{j+1}$ is the voltage at the node j+1, and $P^m_{Load,i}$ and $Q^m_{Load,i}$ are the load active power and reactive power at the node i of the single-phase line m respectively.

7. The method according to claim 6, wherein determining the capability of the feeder in terms of accepting the distributed power supply comprises:

determining the capability of the feeder in terms of accepting the DG according to the maximum active power value of the distributed power supply, and comparing the current value $I^{m*}_{j,j+1}$ with the maximum current limit value $I_{max}$ of the feeder to determine the maximum active power value of the DG connected with the feeder:

1) when $I^{m*}_{j,j+1} < I_{max}$, determining the maximum capacity of the DG connected to the feeder by $V=3 \times P^m_{dg,j+1}$; or
2) when $I^{m*}_{j,j+1} > I_{max}$, calculating the maximum capacity $P^{m*}_{dg,j+1}$ of the distributed power supply connected to the feeder according to a formula (10):

$$I_{max} = \frac{\sqrt{\left(\sum_{i=j+1}^{N}(P^{m*}_{dg,j+1} - P^m_{Load,i})\right)^2 + \left(\sum_{i=j+1}^{N} Q^m_{Load,i}\right)^2}}{V_0} \quad (10)$$

and determining the capability of the feeder line in terms of accepting the distributed power supply by $V^* = 3 \times P^{m*}_{dg,j+1}$.

8. A device for determining a capability of a feeder of a distribution network in terms of accepting distributed generation (DG), comprising: a processor and a memory having stored thereon a computer program which is executable on the processor, wherein the processor is configured to run the computer program to execute the method for determining a capability of a feeder of distribution network in terms of accepting distributed generation (DG), comprising steps of:

S1, determining feeder loss according to load information and line parameters of the feeder of the distribution network;

S2, determining voltage variations of three-phase feeder line according to the feeder loss;

S3, determining a maximum active power value of the DG connected with the feeder under a voltage constraint according to a voltage of a single-phase line with a maximum voltage variations; and S4, comparing a feeder current corresponding to the maximum active power value with a thermal limit of the feeder to determine the capability of the feeder in terms of accepting the DG, using the capability of the feeder in terms of accepting the DG for planning and operation control of the DG to ensure safe connection and control of the DG and safe operation of the distribution network, wherein a voltage between a node j+1 of the feeder connected with the DG and an adjacent node j is calculated according to a formula (1):

$$\begin{bmatrix} V^a_j \\ V^{bj}_j \\ V^{cj}_j \end{bmatrix} = \begin{bmatrix} V^a_{j+1} \\ V^{bj+1} \\ V^{cj+1}_{j+1} \end{bmatrix} + l_{j,j+1} * \begin{bmatrix} Z_{aa} & Z_{ab} & Z_{ac} \\ Z_{ba} & Z_{bb} & Z_{bc} \\ Z_{ca} & Z_{cb} & Z_{cc} \end{bmatrix} \begin{bmatrix} I^a_{j,j+1} \\ I^b_{j,j+1} \\ I^c_{j,j+1} \end{bmatrix} \quad (1)$$

where $V^a_j$, $V^b_j$ and $V^c_j$ are voltages of the three phases a, b and c at the node j respectively, $V^a_{j+1}$, $V^b_{j+1}$ and $V^c_{j+1}$ are voltages of the node j+1 of the three phases a, b and c respectively, $I^a_{j,j+1}$, $I^b_{j,j+1}$ and $I^c_{j,j+1}$ are currents of the three-phase lines between the node j and node j+1 respectively, $Z_{aa}$, $Z_{bb}$ and $Z_{cc}$ are self-impedance of a unit length between the lines of the three phases a, b and c respectively, $Z_{ab}$, $Z_{ac}$, $Z_{ba}$, $Z_{bc}$, $Z_{ca}$ and $Z_{cb}$ are mutual inductive impedance of the unit length between the lines of the three phases a, b and c respectively, and $l_{j,j+1}$ is a length between the node j and the adjacent node j+1.

9. The device according to claim 8, wherein determining the feeder loss according to the load information and line parameters of the feeder of the distribution network in the step S1 comprises:

acquiring information of active load and reactive load at different nodes on the feeder, self-impedance and mutual-impedance of the three-phase lines and upper voltage limit value $V_{upper}$ and maximum current limit value $I_{max}$ of the feeder to determine the feeder loss.

10. The device according to claim 8, wherein the feeder loss in the step S1 comprises:

the apparent power loss, calculated according to a formula (2), of the lines of the three phases:

$$\begin{cases} S^a_{Loss,j} = (I^a_{Loss,j}Z_{aa} + I^b_{Loss,j}Z_{ab} + I^c_{Loss,j}Z_{ac}) \times (I^a_{Loss,j})^* * l_{j,j+1} \\ S^b_{Loss,j} = (I^a_{Loss,j}Z_{ab} + I^b_{Loss,j}Z_{bb} + I^c_{Loss,j}Z_{bc}) \times (I^b_{Loss,j})^* * l_{j,j+1} \\ S^c_{Loss,j} = (I^a_{Loss,j}Z_{ac} + I^b_{Loss,j}Z_{bc} + I^c_{Loss,j}Z_{cc}) \times (I^c_{Loss,j})^* * l_{j,j+1} \end{cases} \quad (2)$$

where * represents a complex conjugate, and $S_{Loss,j}{}^a$, $S_{Loss,j}{}^b$ and $S_{Loss,j}{}^c$ are apparent power losses of lines between the nodes j and j+1 in the phases a, b and c respectively; and loss currents $I_{Loss,j}{}^a$, $I_{Loss,j}{}^b$ and $I_{Loss,j}{}^c$, calculated according to a formula (3), of the branch between nodes j and j+1 of the phases a, b and c:

$$I^a_{Loss,j} = \frac{\sum_{i=j+1}^{N} P_{Load,i} + J\sum_{j=i+1}^{N-1} Q_{Load,i}}{V_0} \angle 0° \quad (3)$$

$$I^b_{Loss,j} = \frac{\sum_{i=j+1}^{N} P_{Load,i} + J\sum_{j=i+1}^{N-1} Q_{Load,i}}{V_0} \angle -120°$$

$$I^c_{Loss,j} = \frac{\sum_{i=j+1}^{N} P_{Load,i} + J\sum_{j=i+1}^{N-1} Q_{Load,i}}{V_0} \angle 120°$$

where J is an imaginary unit, a real part represents line active power, an imaginary part represents line reactive power, $P_{Load,i}$ and $Q_{Load,i}$ are load active power and reactive power at $i^{th}$ node respectively, $V_0$ is a rated node voltage of the feeder, and N is an end node of the feeder.

11. The device according to claim 8, wherein voltage variations $\Delta U_{j,j+1}{}^a$, $\Delta U_{j,j+1}{}^b$ and $\Delta U_{j,j+1}{}^c$ and j+1 of the three-phase feeder are calculated according to a formula (4) in the step S2:

$$\Delta U^a_{j,j+1} = \text{real}(I^a_{j,j+1}Z_{aa} + I^b_{j,j+1}Z_{ab} + I^c_{j,j+1}Z_{ac})*l_{j,j+1}$$

$$\Delta U^b_{j,j+1} = \text{real}(I^b_{j,j+1}Z_{bb} + I^a_{j,j+1}Z_{ba} + I^c_{j,j+1}Z_{bc})*l_{j,j+1}$$

$$\Delta U^c_{j,j+1} = \text{real}(I^c_{j,j+1}Z_{cc} + I^a_{j,j+1}Z_{ca} + I^b_{j,j+1}Z_{cb})*l_{j,j+1} \quad (4)$$

where real represents a real part of complex; and
the currents $I_{j,j+1}{}^a$, $I_{j,j+1}{}^b$ and $I_{j,j+1}{}^c$ between the node j and node j+1 of three-phase lines are calculated according to a formula (5) respectively:

$$I_{j,j+1} = \frac{P_{j+1,N} + JQ_{j+1,N}}{U_{j+1}} \quad (5)$$

where $U_{j+1}$ is a voltage at the node j+1, $P_{j+1,N}$ includes all the active loads and active losses in the branch between the nodes j+1 and N, $Q_{j+1,N}$ includes all the reactive loads and reactive losses in the branch between the nodes j+1 and N, J is an imaginary unit, and $P_{j+1,N}$ and $Q_{j+1,N}$ are calculated according to a formula (6):

$$P_{j+1,N} = \Sigma_{i=j+1}{}^{N} P_{Load,i} + \Sigma_{i=j+1}{}^{N-1} P_{Load,i}$$

$$Q_{j+1,N} = \Sigma_{i=j+1}{}^{N} Q_{Load,i} + \Sigma_{i=j+1}{}^{N-1} Q_{Load,i} \quad (6)$$

where $P_{Load,i}$ and $Q_{Load,i}$ represent the load active power and reactive power at the node i respectively, and $P_{Loss,i}$ and $Q_{Loss,i}$ represent line active loss and reactive loss between nodes i and i+1 respectively.

12. The device according to claim 8, wherein, in the step S3, the voltage variations of the three-phase lines after the DG is connected with the feeder are compared to determine the single-phase line m with the maximum voltage variation, and a voltage drop between a first node the single-phase line m in the feeder and the node where the DG is connected is represented according to a formula (7):

$$V_{upper} - V_0 = \Delta U^m_{1,2} + \Delta U^m_{2,3} + \ldots \Delta U^m_{j-1,j} + \Delta U^m_{j,j+1} \quad (7)$$

where m=a, b, c and represents the single-phase line of the feeder, $\Delta U_{j,j+1}{}^m$ is a voltage variation between the nodes j and j+1 of the single-phase line m of the feeder, and j=1, 2, 3, ..., N−1,
wherein a calculation formula for a current of the single-phase line m after the DG is connected with the single-phase line is expressed as a formula (8):

$$I^m_{j,j+1} = \frac{\left(\sum_{i=j+1}^{N}(P^m_{dg,j+1} - P^m_{Load,i}) - \sum_{i=j+1}^{N-1} P^m_{Loss,i}\right) + J\left(\sum_{i=j+1}^{N} Q^m_{Load,i} + \sum_{i=j+1}^{N-1} Q^m_{Loss,i}\right)}{V_0} \quad (8)$$

where $P_{dg,j+1}{}^m$ represents an active power of the distributed power supply connected at the node j+1 of the single-phase line m, $P_{Load,i}{}^m$ and $Q_{Load,i}{}^m$ represent load active power and reactive power at the node i of the single-phase line m respectively and $P_{Loss,i}{}^m$ and $Q_{Loss,i}{}^m$ represent load active loss and reactive loss at the node i of the single-phase line m respectively; and
the maximum active power value of the distributed power supply connected at the node j+1 of the feeder is: $V=3\times P^m_{dg,j+1}$.

13. The device according to claim 8, wherein a current value $I_{j,j+1}{}^{m*}$ of the DG is calculated according to a formula (9) in the step S4:

$$I^{m*}_{j,j+1} = \frac{\sqrt{\left(\sum_{i=j+1}^{N}(P^m_{dg,j+1} - P^m_{Load,i})\right)^2 + \left(\sum_{i=j+1}^{N} Q^m_{Load,i}\right)^2}}{U_{j+1}} \quad (9)$$

where $U_{j+1}$ is the voltage at the node j+1, and $P_{Load,i}{}^m$ and $Q_{Load,i}{}^m$ are the load active power and reactive power at the node i of the single-phase line m respectively.

14. The device according to claim 13, wherein determining the capability of the feeder in terms of accepting the distributed power supply comprises:
determining the capability of the feeder in terms of accepting the DG according to the maximum active power value of the distributed power supply, and comparing the current value $I_{j,j+1}{}^{m*}$ with the maximum current limit value $I_{max}$ of the feeder to determine the maximum active power value of the DG connected with the feeder:
1) when $I_{j,j+1}{}^{m*} < I_{max}$, determining the maximum capacity of the DG connected to the feeder by $V=3\times P_{dg,j+1}{}^m$; or
2) when $I_{j,j+1}{}^{m*} > I_{max}$, calculating the maximum capacity $P_{dg,j+1}{}^{m*}$ of the distributed power supply connected to the feeder according to a formula (10):

$$I_{max} = \frac{\sqrt{\left(\sum_{i=j+1}^{N}(P_{dg,j+1}^{m*} - P_{Load,i}^{m})\right)^2 + \left(\sum_{i=j+1}^{N} Q_{Load,i}^{m}\right)^2}}{V_0} \quad (10)$$

and determining the capability of the feeder line in terms of accepting the distributed power supply by $V^* = 3 \times P_{dg,j+1^\circ}^{m*}$.

15. A non-transitory computer-readable storage medium having stored thereon a computer program that when executed by a processor, causes the processor to perform the method for determining a capability of a feeder of distribution network in terms of accepting distributed generation (DG), comprising steps of:
    S1, determining feeder loss according to load information and line parameters of the feeder of the distribution network;
    S2, determining voltage variations of three-phase feeder line according to the feeder loss;
    S3, determining a maximum active power value of the DG connected with the feeder under a voltage constraint according to a voltage of a single-phase line with a maximum voltage variations; and
    S4, comparing a feeder current corresponding to the maximum active power value with a thermal limit of the feeder to determine the capability of the feeder in terms of accepting the DG, using the capability of the feeder in terms of accepting the DG for planning and operation control of the DG to ensure safe connection and control of the DG and safe operation of the distribution network,
    wherein a voltage between a node j+1 of the feeder connected with the DG and an adjacent node j is calculated according to a formula (1):

$$\begin{bmatrix} V_j^a \\ V_j^b \\ V_j^c \end{bmatrix} = \begin{bmatrix} V_{j+1}^a \\ V_{j+1}^b \\ V_{j+1}^c \end{bmatrix} + l_{j,j+1} * \begin{bmatrix} Z_{aa} & Z_{ab} & Z_{ac} \\ Z_{ba} & Z_{bb} & Z_{bc} \\ Z_{ca} & Z_{cb} & Z_{cc} \end{bmatrix} \begin{bmatrix} I_{j,j+1}^a \\ I_{j,j+1}^b \\ I_{j,j+1}^c \end{bmatrix} \quad (1)$$

where $V_j^a$, $V_j^b$ and $V_j^c$ are voltages of the three phases a, b and c at the node j respectively, $V_{j+1}^a$, $V_{j+1}^b$ and $V_{j+1}^c$ are voltages of the node j+1 of the three phases a, b and c respectively, $I_{j,j+1}^a$, $I_{j,j+1}^b$ and $I_{j,j+1}^c$ are currents of the three-phase lines between the node j and node j+1 respectively, $Z_{aa}$, $Z_{bb}$ and $Z_{cc}$ are self-impedance of a unit length between the lines of the three phases a, b and c respectively, $Z_{ab}$, $Z_{ac}$, $Z_{ba}$, $Z_{bc}$, $Z_{ca}$ and $Z_{cb}$ are mutual inductive impedance of the unit length between the lines of the three phases a, b and c respectively, and $l_{j,j+1}$ is a length between the node j and the adjacent node j+1.

* * * * *